United States Patent [19]

Rush, II et al.

[11] Patent Number: 5,261,375
[45] Date of Patent: Nov. 16, 1993

[54] FUEL INJECTION ASSEMBLY FOR INTEGRATED INDUCTION SYSTEM

[75] Inventors: William B. Rush, II, Wadsworth, Ill.; Jack E. Elder, Rochester, Mich.; Karl J. Haltiner, Jr., Fairport; Grant M. Wheeler, Rochester, both of N.Y.

[73] Assignee: General Motors Corporation, Detroit, Mich.

[21] Appl. No.: 575,534

[22] Filed: Aug. 29, 1990

Related U.S. Application Data

[63] Continuation-in-part of Ser. No. 432,295, Nov. 6, 1989, Pat. No. 5,003,933.

[51] Int. Cl.⁵ .......................................... F02M 55/02
[52] U.S. Cl. .................................. 123/470; 123/456
[58] Field of Search ............... 123/456, 470, 472, 469, 123/468; 239/600

[56] References Cited

U.S. PATENT DOCUMENTS

| | | | |
|---|---|---|---|
| 3,776,209 | 12/1973 | Wertheimer et al. | 123/119 |
| 3,930,483 | 11/1976 | Blisko | 123/470 |
| 4,232,830 | 11/1980 | Casey et al. | 239/585 |
| 4,341,186 | 7/1982 | Mayr et al. | 123/52 |
| 4,440,120 | 4/1984 | Butler | 123/52 |
| 4,457,280 | 7/1984 | Hudson, Jr. | 123/470 |
| 4,463,711 | 8/1984 | Yoshioka | 123/52 |
| 4,475,486 | 10/1984 | Kessler | 123/52 |
| 4,563,984 | 1/1986 | Ziegler et al. | 123/52 |
| 4,586,477 | 6/1986 | Field et al. | 123/468 |
| 4,643,136 | 2/1987 | Ura et al. | 123/52 |
| 4,686,944 | 8/1987 | Hiraoka et al. | 123/52 |
| 4,693,223 | 9/1987 | Eshleman et al. | 123/468 |
| 4,719,879 | 1/1988 | Kato et al. | 123/52 |
| 4,726,329 | 2/1988 | Atkin | 123/52 |
| 4,765,286 | 8/1988 | Lyjak et al. | 123/52 |
| 4,768,487 | 9/1988 | Yamamoto et al. | 123/470 |
| 4,776,313 | 10/1988 | Freismuth et al. | 123/470 |
| 4,798,187 | 1/1989 | Hudson, Jr. | 123/469 |
| 4,805,564 | 2/1989 | Hudson, Jr. | 123/52 |
| 4,805,575 | 2/1989 | de Concini et al. | 123/468 |
| 4,829,942 | 5/1989 | Ampferer | 123/52 |
| 4,867,110 | 9/1989 | Distelrath | 123/52 |
| 5,003,933 | 4/1991 | Rush, II et al. | 123/52 |
| 5,005,535 | 4/1991 | Binversie et al. | 123/52 |
| 5,014,673 | 5/1991 | Fujimoto et al. | 123/512 |
| 5,016,594 | 5/1991 | Hafner | 123/456 |
| 5,030,116 | 7/1991 | Sakai | 123/470 |
| 5,058,554 | 10/1991 | Takada | 123/470 |
| 5,058,555 | 10/1991 | Hadoosh | 123/470 |
| 5,070,844 | 12/1991 | Daly | 123/470 |
| 5,094,194 | 3/1992 | Rush, II et al. | 123/52 |
| 5,097,594 | 3/1992 | Daly et al. | 29/888.01 |
| 5,101,792 | 4/1992 | Koch | 123/456 |

FOREIGN PATENT DOCUMENTS

| | | | |
|---|---|---|---|
| 0095251A1 | 4/1983 | European Pat. Off. | |
| 186458 | 8/1956 | German Democratic Rep. | 123/470 |
| 0113044 | 9/1981 | Japan | 123/470 |
| 0188670 | 7/1990 | Japan | 123/470 |
| 88/03606 | 5/1988 | World Int. Prop. O. | |

OTHER PUBLICATIONS

AC Rochester Division, General Motors Corporation; "1989 New Product Information", Publication No. 9D-1989; pp. 2, 16–21, 23–25, 27–29, 46; 1988; Rochester, N.Y.

Great Britain Patent Office letter, dated 17 Jan. 1991 (attached search report search date, 5 Jan. 1991).

1989 New Product Information, pp. 17, 19–21, 24, 27–29, 46.

Great Britain Search Report, 5 Jan. 1991.

*Primary Examiner*—Carl S. Miller
*Attorney, Agent, or Firm*—Charles K. Veenstra

[57] ABSTRACT

An integrated induction system for providing fluids to the cylinders in an engine comprises a casing adapted for mounting on the engine. The casing has an air inlet and a plurality of fluid outlets. A plurality of air tubes are disposed within the casing so that air entering the air inlet flows through the air tubes and respective fluid outlets to the cylinders. A fuel injection assembly is mounted within the casing to inject fuel into the air exiting the air tubes adjacent each of the fluid outlets causing a mixture of air and fuel to enter the respective cylinders.

4 Claims, 9 Drawing Sheets

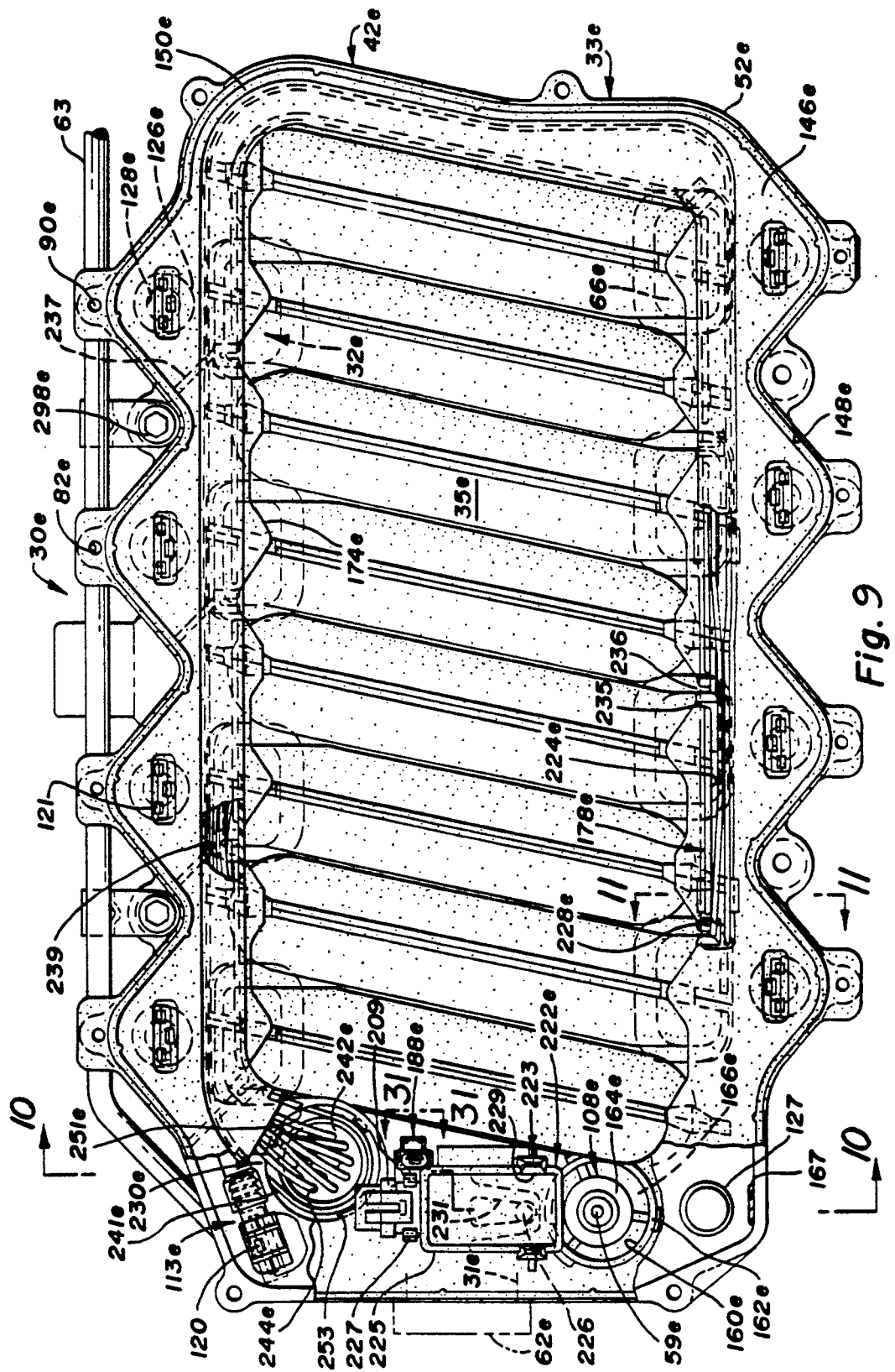

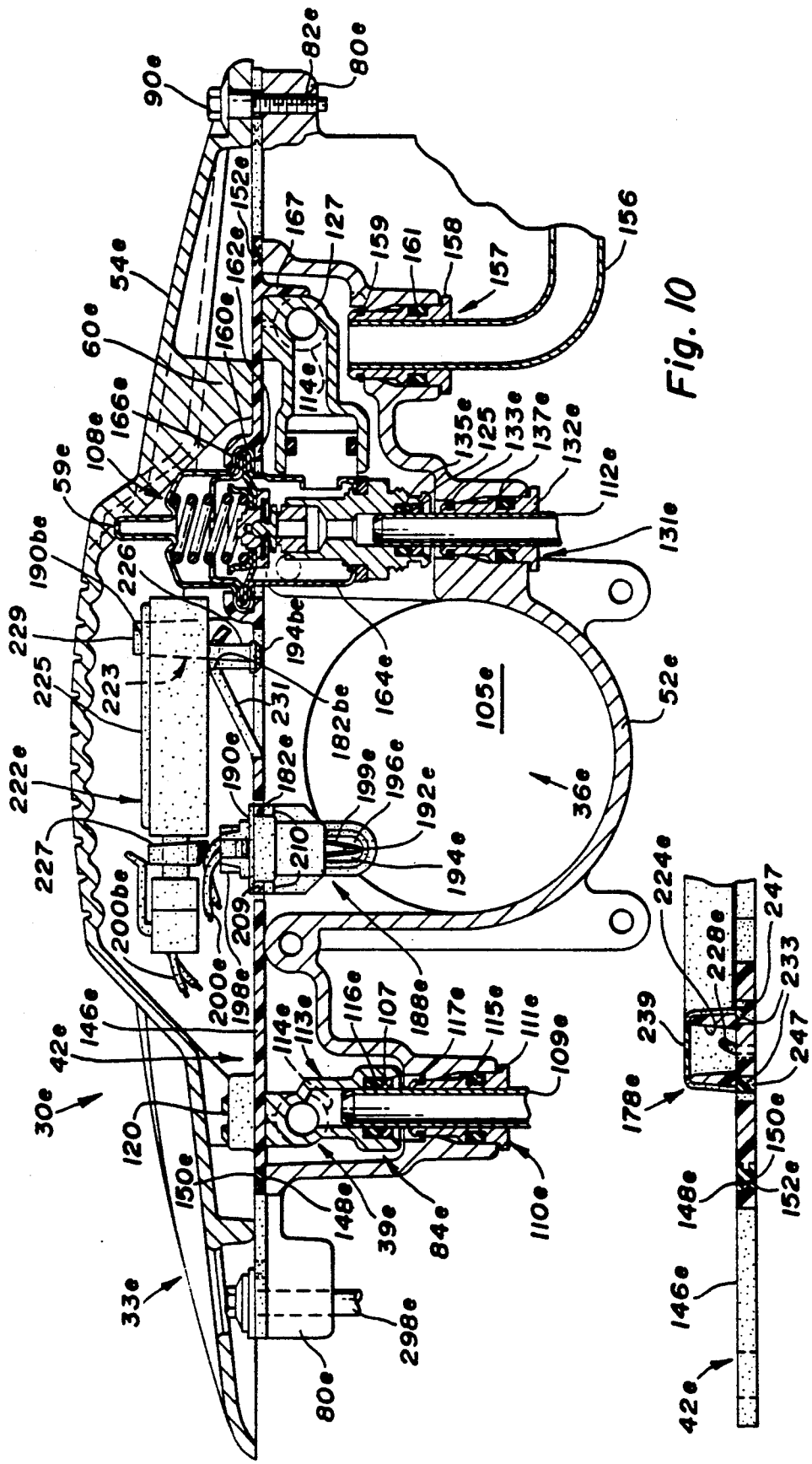

FUEL INJECTION ASSEMBLY FOR INTEGRATED INDUCTION SYSTEM

This is a continuation-in-part of copending application Ser. No. 432,295 filed Nov. 6, 1989, now U.S. Pat. No. 5,003,933 and assigned to the same assignee.

Technical Field

This invention relates to a fuel injection assembly and, more particularly, to a fuel injection assembly for an integrated induction system for delivering fluids to the cylinders of an engine.

Background

Intake manifolds commonly deliver air to the cylinders of an engine. Other fluids are typically delivered to the cylinders of an engine by systems connected to or separate from the intake manifold, such as fuel injection systems, exhaust gas recirculation systems, positive crankcase ventilation systems and fuel tank vapor systems. The components for these various systems are commonly assembled separately from the intake manifold and individually mounted on the engine or manifold.

Separate assembly of the intake manifold and the various fluid delivery system components can entail considerable difficulty and expense due to the interdependency of the various systems. Proper alignment, tight connections and fully coordinated control systems are often critical to the optimum functioning of the various systems. Such design and manufacturing requirements can be difficult to meet when separately assembling the various system assemblies and mounting them on an engine. For similar reasons, mounting the assembled components of these various systems as separate assemblies can also require substantial effort and expense.

The fluid delivery systems described above typically include many relatively small and fragile components as compared to other engine components such as blocks and cylinder heads. Some of the components of the fluid delivery systems must be connected with similar components in other fluid delivery systems after their attachment to the engine. Engine assembly can therefore be made very complex due to the methods required to connect the components of the various fluid delivery systems to one another and to the engine as contrasted with the methods used to assemble the larger engine components.

Many of the fluid delivery system assemblies are often rigidly attached to the engine in close proximity to one another and have a number of rigid connections between the various components of the different systems. Therefore, access to one system assembly often requires the difficult disengagement of a number of rigid connections as well as removal of a number of components to gain access to the desired components.

Summary of the Invention

The present invention provides a fuel injection system for an integrated induction system which contains in one assembly many of the components of the fuel injection system of an engine which have heretofore been separately assembled and mounted on the engine.

The integrated induction system comprises a casing adapted for mounting on the engine. The casing has an air inlet and a plurality of fluid outlets. Each of the fluid outlets is adapted to communicate with a respective cylinder in the engine. A plurality of air tubes are disposed within the casing with the air tubes occupying a portion of the interior of the casing and the unoccupied portion of the casing constituting a plenum. The air tubes are positioned within the casing so that the plenum provides a flow path from the air inlet to the air tubes. One end of each of the air tubes opens from the plenum and the other end engages the casing adjacent one of the fluid outlets to allow communication between the plenum and the cylinders in the engine. Air entering into the plenum through the air inlet is thereby introduced via each of the air tubes into the respective cylinders. A fuel injection assembly is mounted within the casing to inject fuel into the air exiting the air tubes adjacent each of the fluid outlets to cause a mixture of air and fuel to enter the respective cylinders.

Containment of the fuel injection system components within a casing has a number of advantages. The casing can protect the fuel injection system components contained within it. This allows the use of easily releasable connectors to connect the components inside the casing to one another and to the casing. The number of fasteners required is thereby reduced to facilitate assembly of the components. The casing also muffles the noise produced by the components contained within it reducing the sound produced by the engine.

Assembly of the integrated induction system is facilitated by containment of the fuel injection system components within the casing. Alignment, connection and coordination of the various components can take place separate from the assembly of the other parts of the engine in an environment specifically designed to facilitate assembly of many of these small components. Testing of the various fuel injection system components prior to attachment to the engine is also possible. The integrated induction system may then be mounted on the engine as a tested, single unit comparable in size to many of the other components typically handled during assembly of an engine.

These and other features and advantages of the invention will be more fully understood from the following description of certain specific embodiments of the invention taken together with the accompanying drawings.

Brief Drawing Description

In the drawings:

FIG. 9 is a plan view in the plane indicated by line 9—9 of FIG. 8 with the cover removed and part of the carrier being broken away showing some components in assembly;

FIG. 10 is an enlarged sectional view generally in the plane indicated by line 10—10 of FIG. 9 showing some components connected to the carrier adjacent the air inlet;

FIG. 11 is an enlarged sectional view generally in the plane indicated by line 11—11 of FIG. 9 showing the conduit;

Corresponding reference characters indicate corresponding parts throughout the several views of the drawings.

Detailed Description

Figure 8:
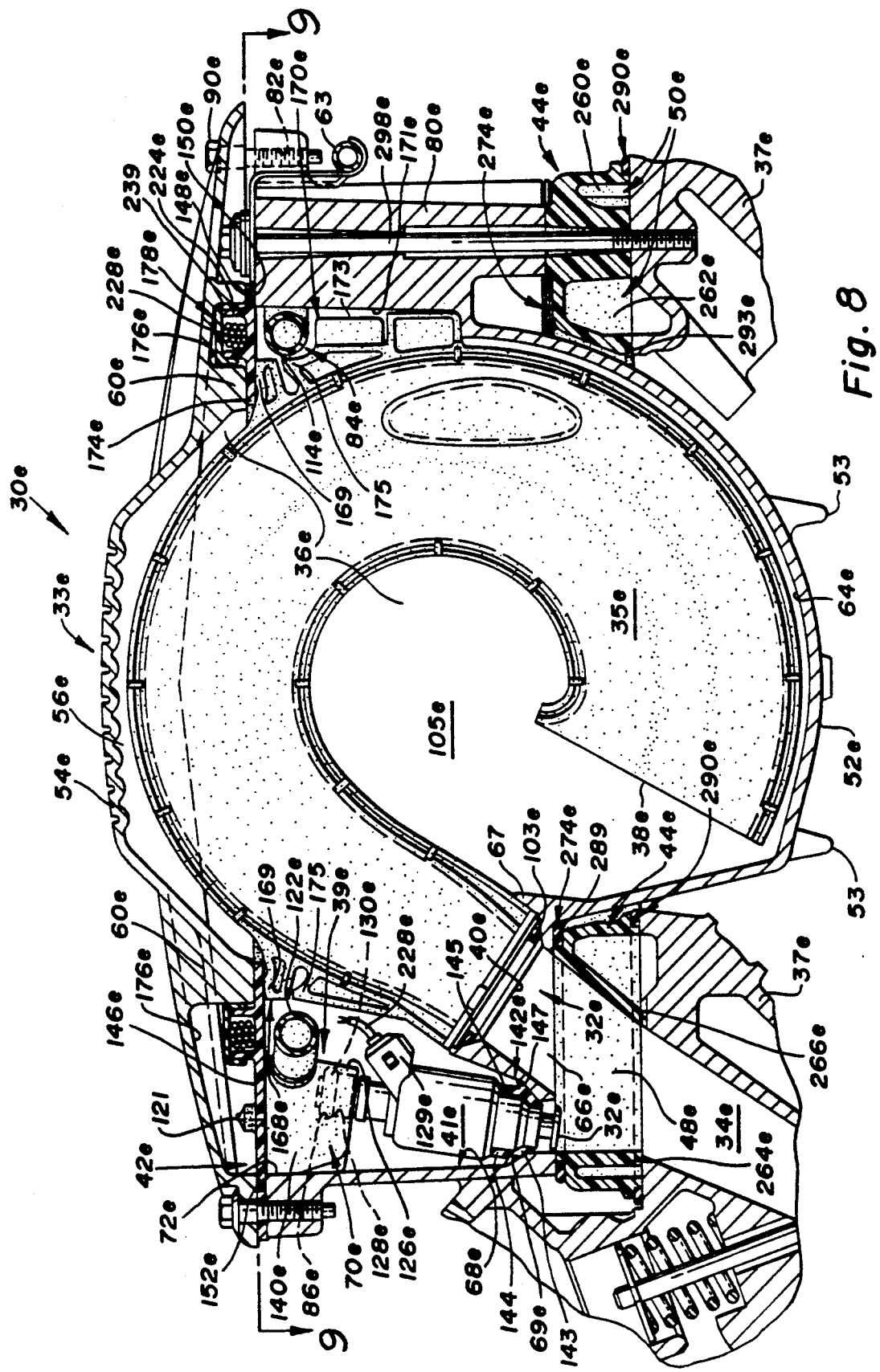
FIG. 8 is an enlarged transverse sectional view of an alternative embodiment of the integrated induction system of FIG. 1 generally in a plane between the air tubes showing some components in assembly.

Referring now to FIGS. 1, 2, 3 and 4 of the drawings, numeral 30 generally indicates an integrated induction system of the present invention to provide air, fuel and other fluids to the cylinders in the engine. An alternative embodiment of the integrated induction system 30e is shown in FIGS. 8, 9 and 10. Parts similar to those shown in FIGS. 1, 2, 3 and 4 have the same reference numeral with the addition of the suffix e. Briefly, the integrated induction system 30 comprises a casing 33, a plurality of air tubes 35 disposed within the casing and a fuel injection assembly 39 mounted within the casing. The casing 33 has an air inlet 31 enabling air to enter the casing and a plurality of fluid outlets 32 enabling fluids to exit the casing. The fluid outlets 32 are formed in the casing 33 so that, when the casing is mounted on the cylinder heads 37, each fluid outlet 32 communicates with a respective cylinder inlet 34.

The air tubes 35 occupy a portion of the interior volume of the casing 33 with the unoccupied portion of the casing constituting a plenum 36. The air tubes 35 are positioned in the casing 33 so that the plenum 36 provides a flow path from the air inlet 31 to the air tubes. One end of each air tube 35, constituting the air tube inlet 38, opens from the plenum 36. The other end of the air tube 35, constituting the air tube outlet 40, engages the casing 33 adjacent a respective fluid outlet 32 to allow communication between the plenum 36 and a respective cylinder. Air entering into the plenum 36 through the air inlet 31 is thereby introduced via each of the air tubes 35 into the respective cylinders.

The fuel injection assembly 39 includes a fuel injector 41 directed toward each fluid outlet 32. The fuel injectors 41 inject fuel into the air exiting the air tubes 35 adjacent the fluid outlets 32 to cause a mixture of air and fuel to enter the respective cylinders. The integrated induction system 30 may also include a carrier 42 connected to the fuel injection assembly 39 and other components contained within the casing 33.

The casing 33 may be supported on distribution mountings 44 disposed between it and the cylinder heads 37. Each distribution mounting 44 has mounting passages 48 which allow communication between the casing and cylinders to enable the air and fuel inside the casing to enter the cylinders.

Casing

Figure 1:
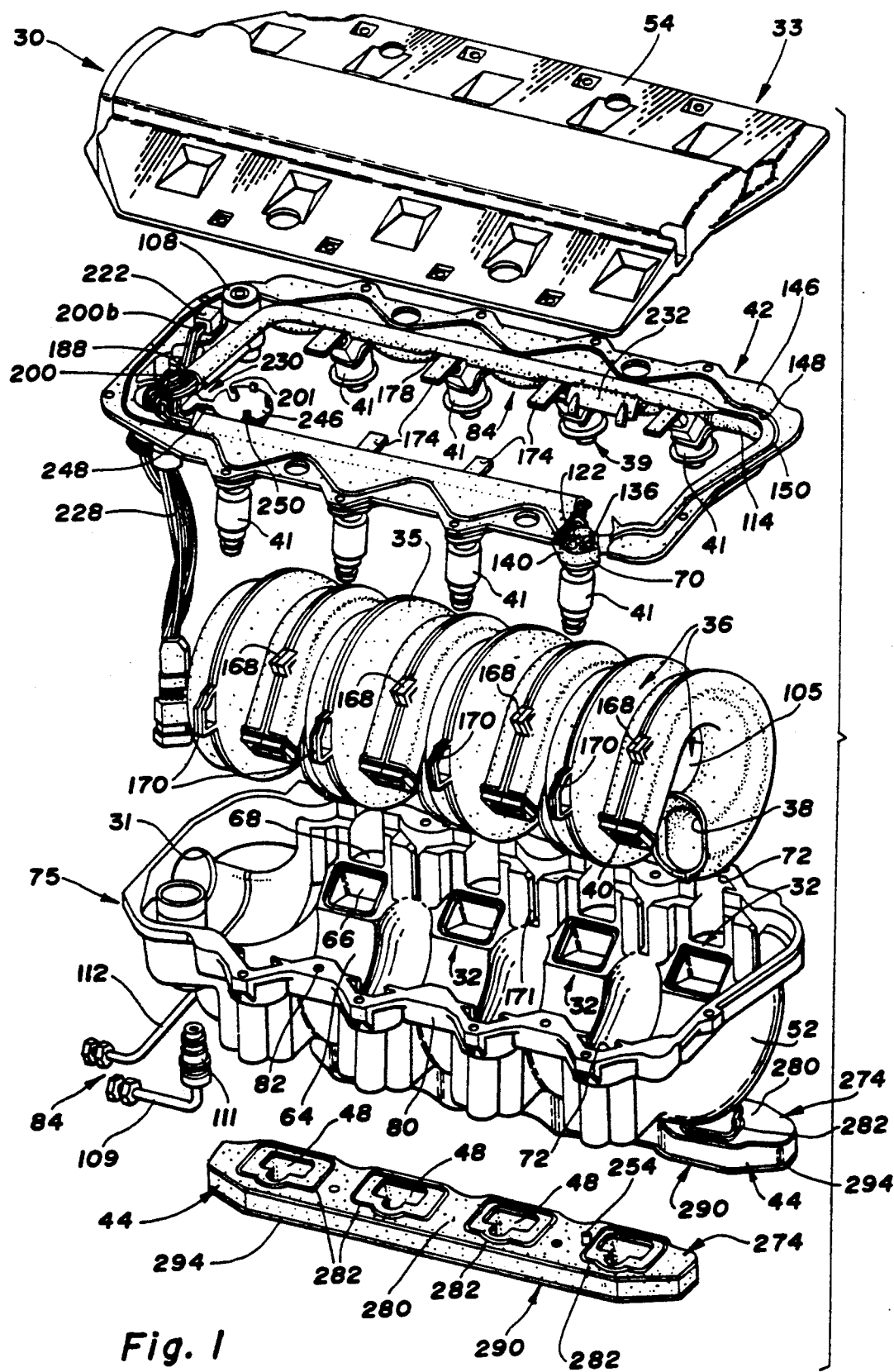
FIG. 1 is an exploded view of an integrated induction system in accordance with the present invention.
Figure 2:
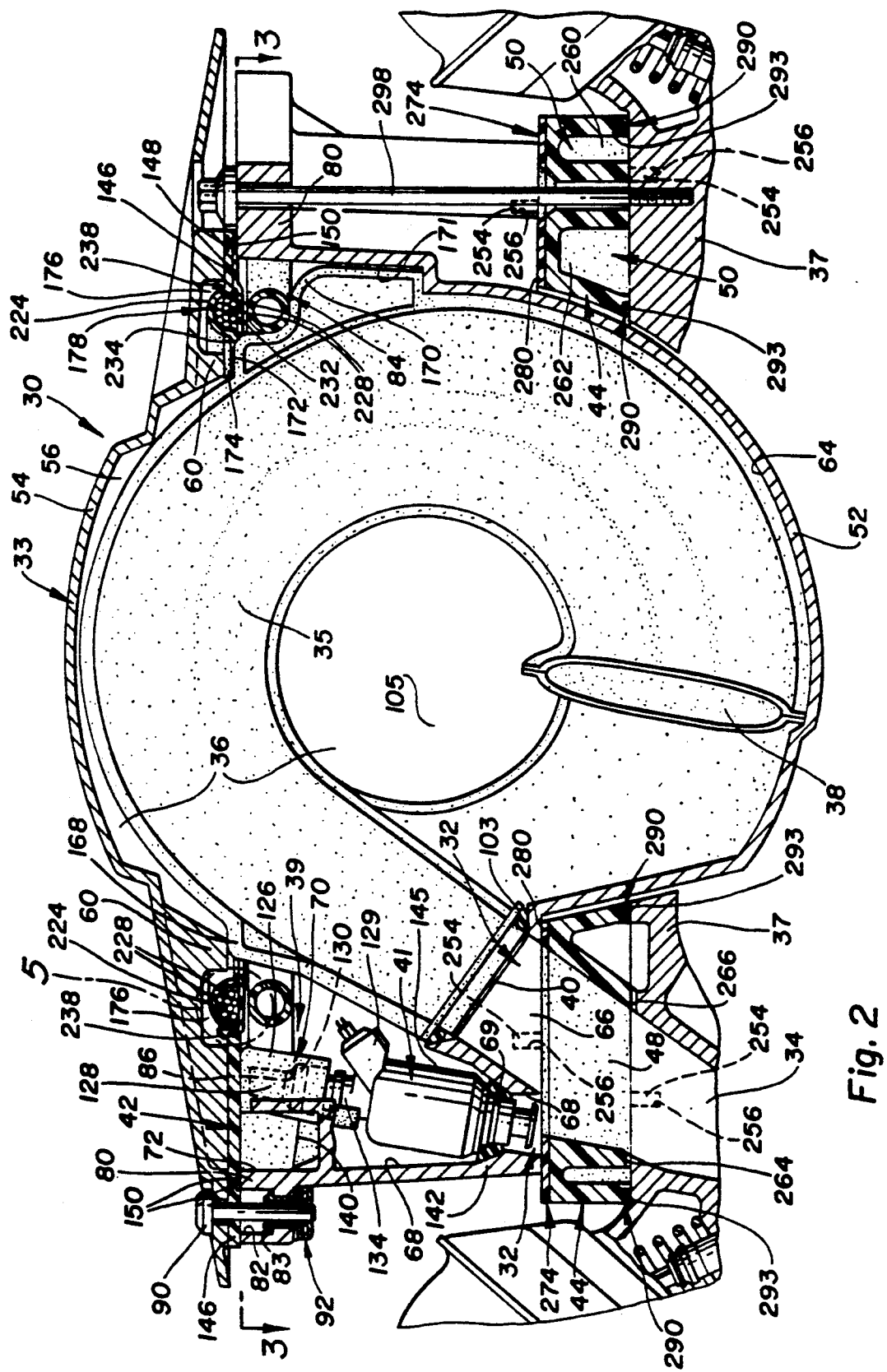
FIG. 2 is an enlarged transverse sectional view of the integrated induction system of FIG. 1 generally in a plane between air tubes showing some components in assembly.
Figure 4:
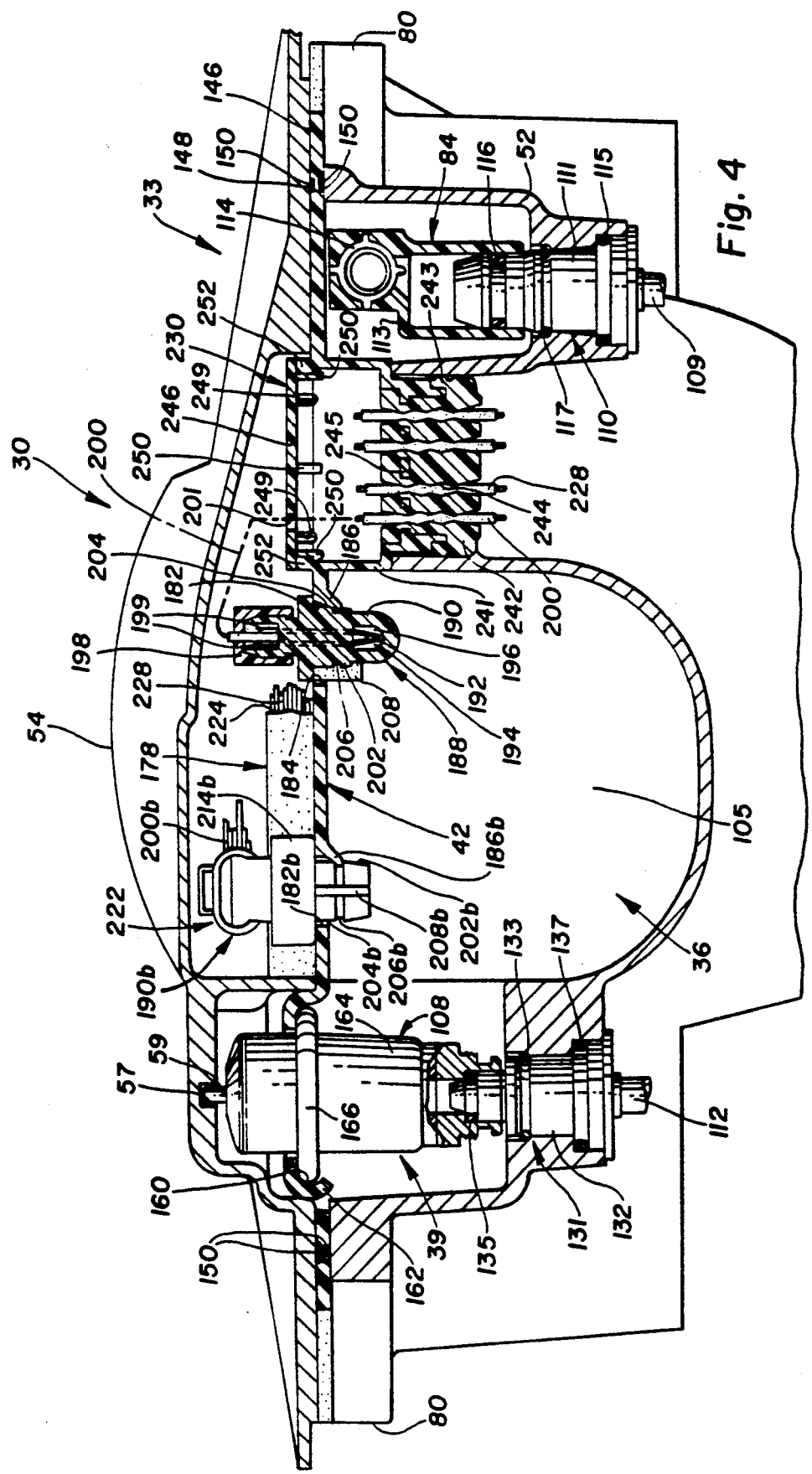
FIG. 4 is an enlarged sectional view generally in the plane indicated by line 4—4 of FIG. 3 showing some components connected to the carrier adjacent the air inlet.

As shown in FIGS. 1 and 2, the casing 33 comprises an enclosure defined by a shell 52 and a cover 54. The cover 54 is removable to provide access to the interior of the casing 33. The cover 54 has a cylindrical recess 57 in its bottom surface into which the vacuum inlet 59 of a fuel pressure regulator 108 extends, as shown in FIG. 4. The recess 57 is larger than the vacuum inlet 59 to allow the air inside the casing to communicate with the fuel pressure regulator 108.

As shown in FIG. 1, the shell 52 has an air inlet 31 comprising an opening formed in one end of the shell adjacent its top. The outer surface of the shell 52 adjacent the air inlet 31 is flat to enable a throttle body 62, shown in FIG. 3, or other air metering device to be mounted on it to regulate the flow of air into the casing 33.

As shown in FIGS. 1 and 2, the shell 52 has fluid outlets 32 comprising openings formed in the bottom of the shell adjacent its sides. The fluid outlets 32 mate with respective mounting passages 48 to allow communication between the inside of the casing 33 and the cylinders. The inner rows of fluid outlets 32 allow communication between the air tubes 35 and the cylinders and constitute the air outlets 66. The outer rows of fluid outlets 32 allow communication between the fuel injectors 41 and the cylinders and are constituted by openings in injector seats 68. Each injector seat 68 has a chamfered seat base 69 which includes the opening. The injector seats 68 are cup shaped to support the outlet of each fuel injector 41 mounted within it so that fuel can exit the fuel injector and flow through the opening in the seat base 69 toward the cylinder inlet 34e. The shell 52 also has a pod socket 72 adjacent each injector seat 68 to provide a mounting for the fuel injection assembly 39.

As shown in FIG. 1, a casing flange 80 is formed in the sides of the shell 52 adjacent its upper edge to serve as a mounting for the cover 54. As shown in FIGS. 1 and 2, each casing flange 80 has a plurality of connecting bores 82. Each connecting bore 82 has an enlarged upper portion, producing a step 83 for connection of a spring clip 92. Threaded connecting bolts 90 extend through openings in the cover 54 into each connecting bore 82. The spring clip 92 has internal threads corresponding to the external threads on the connecting bolts 90. This enables each connecting bolt 90 to be screwed into a respective spring clip 92 adjacent the casing flange 80 to hold the cover 54 against the shell 52.

Air Tubes

As shown in FIGS. 1 and 2, the air tubes 35 are located inside the casing 33 with the individual air tubes in side-to-side relation with respect to one another. The air tubes 35 are arranged so that their centers of curvature are approximately collinear. The inner curves of the air tubes 35 thereby define a cylindrical region constituting the principal portion 105 of the plenum 36.

Fuel Injection Assembly

The fuel injection assembly 39 shown in FIGS. 1, 2, 3 and 4 includes the fuel injectors 41 and a fuel distribution assembly 84 which connects the fuel injectors and allows fuel to flow to each of them. The fuel distribution assembly 84 includes an injector pod 70 connected to each fuel injector 41 and fuel tubes 114 which serially connect the fuel injectors. The fuel tubes 114 are constructed of plastic, and include type 12 nylon. The fuel tube 114 preferably has rubber washers encircling its outer surface to space at least portions of the fuel tube away from the casing 33.

Figure 7:
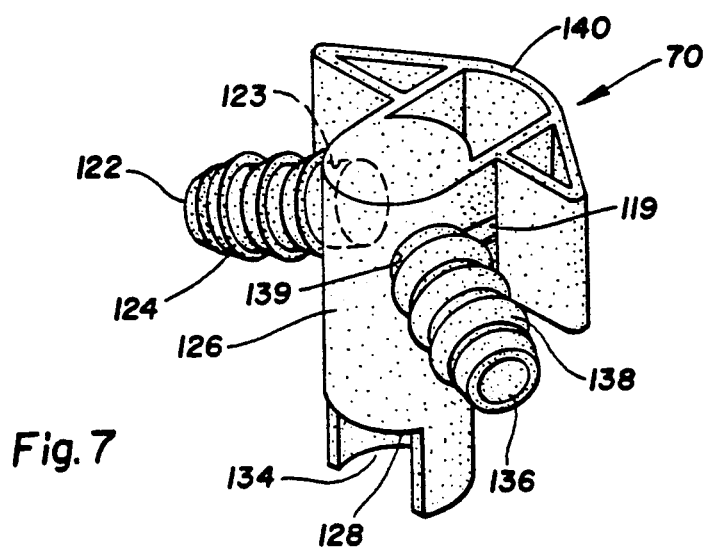
FIG. 7 is a perspective view of the injector pod shown in FIG. 6.

Each injector pod 70 is constructed of glass reinforced nylon and includes type 12 or 66 nylon. The injector pod 70 has a hollow injector mounting 126 as shown in FIGS. 2 and 7. The injector mounting 126 includes an integral injector socket 128 with a cross section which is larger than the cross section of the inlet of the fuel injector 41 so that a fuel injector can be inserted into the socket. An O-ring 130 provides a seal between the fuel injector 41 and the injector mounting 126, and resists removal of the fuel injector from it. The walls of the injector socket 128 have a chamfered portion 86 adjacent the closed end of the injector socket. When the fuel injector 41 and O-ring 130 are inserted into the injector mounting 126, the O-ring engages the chamfered portion 86 which limits the travel of the fuel injector into the injector socket 128.

Each injector mounting 126 has an injector slot 134 adjacent its opening so that, when the fuel injector 41 is inserted in the injector socket 128, an electrical connector 129 extending from the side of the injector is received in the injector slot. The fuel injector 41 is thereby retained in a predetermined angular orientation with respect to the axis of the injector socket 128. Each injector mounting 126 also has a fastening means including an integral inlet ledge 118 and outlet ledge 119 on its outer surface. As shown in FIGS. 8 and 9, the fastening means may alternatively include three resilient pod latches 121 each comprising a resilient spring arm extending upward from the injector pod 70e, and a resilient finger integral with the end of each spring arm.

Each injector pod 70 has an integral tubular inlet projection 122 extending away from the injector mounting 126 adjacent its inlet ledge 118. The inlet projection 122 registers with an inlet 123 on the injector mounting 126 to allow fuel to flow through the inlet projection into the injector socket 128 to supply the fuel injector 41 retained in it. The inlet projection 122 is inserted into the resilient opening in one end of a fuel tube 114. The inlet projection 122 has sufficiently thick exterior circumferential beads 124 to securely retain the fuel tube 114 to the inlet projection.

Each injector pod 70 has an integral tubular outlet projection 136 extending away from the injector mounting 126 adjacent its outlet ledge 119. The outlet projection 136 registers with an outlet 139 on the injector mounting 126 to allow excess fuel to be discharged from it through the outlet projection. The outlet projection 136 is inserted into the resilient opening in the end of another fuel tube 114. The outlet projection 136 has sufficiently thick exterior circumferential beads 138 to securely retain the fuel tube 114 to the outlet projection.

The injector pod 70 includes an integral shoulder 140 having an eccentric cross section. Each pod socket 72 has a cross section corresponding to that of a shoulder 140. Each pod socket 72 is slightly larger than the corresponding shoulder 140 to enable each shoulder to be inserted into a pod socket. The small clearance between each shoulder 140 and the corresponding pod socket 72 results in resistance to rotation of the shoulder in the pod socket. This facilitates alignment of each fuel injector 41 with respect to the shell 52.

Insertion of each shoulder 140 in a corresponding pod socket 72, in combination with the receipt of the electrical connector 129 in the injector slot 134, enables each fuel injector 41 to be angularly aligned with respect to the shell 52. Since the shell 52 is fixed with respect to the cylinders, the fuel injectors 41 can be angularly aligned with respect to them. This enables a fuel injector having multiple fuel sprays, such as those used with cylinders having multiple intake ports, to be positioned so that each fuel spray is aimed directly into a respective cylinder intake port.

Each fuel injector 41 has a frustoconical seal ring 142 constructed of nitrile rubber to provide a seal between each fuel injector and the corresponding injector seat 68. The shape of the seal ring 142 enables it to limit the displacement of the fuel injector 41 through the opening in the seat base 69. The limitations on displacement provided by the seal ring 142 and the chamfered portion 86 facilitate alignment of the fuel injector 41 in the injector seat 68.

The seal ring 142 may have a cylindrical skirt to enhance the seal between each fuel injector 41 and the corresponding injector seat 68e. For example, the seal ring 142e may include a support means comprising a frustoconical portion 143 adapted to engage the seat base 69e to obstruct axial displacement of the seal ring toward the seat base. The outer diameter of the frustoconical portion 143 decreases along the longitudinal axis of the fuel injector 41e toward the seat base 69e to facilitate coaxial positioning of the fuel injector in the injector seat 68e. The support means further comprises a cylindrical portion 144 adapted to engage the enlarged portion of the fuel injector 41e, which constitutes a stop 145e, to obstruct axial displacement of the seal ring 142e with respect to the fuel injector away from the seat base 69e. The support means further includes an integral annular skirt 147. The skirt 147 has an axial thickness sufficiently small to allow relative movement between the seal ring 142e and seat base 69e while maintaining a seal between the fuel injector 41e and seat base. When the fuel injector 41e is supported on the seat base 69e, the engagement of the cylindrical portion 144 with the stop 145e limits travel of the skirt 147 away from the seat base 69e.

The injector pods 70 may be used with other fuel injection assemblies to connect fuel injectors to fuel tubes, and to a casing or other part of an engine. The injector pods 70 may also be used to hold fuel injectors in alignment with respect to cylinders.

The construction of the injector pods 70 and their connection to the fuel tubes 114 allows fuel to flow through the fuel tubes 114 into each injector pod 70 to supply the respective fuel injector 41 connected to it. The portion of the fuel in each injector pod 70 which does not flow into the associated fuel injector 41 is discharged from the injector pod and allowed to supply the adjacent injector pod. Fuel is thereby able to flow through the string of connected fuel injectors 41 to serially supply each of them.

The fuel distribution assembly 84 includes a stainless steel fuel inlet tube 109 which extends through an opening in the shell 52 and a fuel inlet connector 110. The end of the fuel inlet tube 109 outside the casing 33 is connected to a fuel source and the other end is connected, via the fuel inlet connector 110, to the inlet of the string of connected fuel injectors 41. Fuel is thereby able to flow from the fuel source into the fuel injectors 41. Connected to the fuel inlet tube 109 may be a tap to which a pressure gauge may be releasably connected to enable measurement of the pressure in the fuel inlet tube.

The fuel inlet connector 110 includes a fuel inlet fitting 111 and a metal snap ring 117 which, when the fuel inlet fitting is inserted into the opening in the shell 52, expands into a recess in it to resist removal of the fuel inlet fitting from the shell. A nylon fuel tube inlet fitting 113 connects the fuel inlet fitting 111 to the fuel tube 114. A lower O-ring 115 provides a seal between the fuel inlet fitting 111 and shell 52. An upper O-ring 116 provides a seal between the fuel inlet fitting 111 and fuel tube inlet fitting 113.

Alternative embodiments of the fuel inlet connector 110e and fuel tube inlet fitting 113e are shown in FIGS. 9 and 10. The fuel inlet connector 110e includes a separate plastic inlet ring 107 which has an interference fit between the fuel tube inlet fitting 113e and fuel inlet tube 109e to obstruct the upper O-ring 116e from dropping out of the fuel tube inlet fitting. The nylon fuel tube inlet fitting 113e has fingers 120 which snap into a slot on the base strip 146e to provide support to the fuel inlet tube 109e. The connection between the fuel tube inlet fitting 113e and base strip 146e also causes the fuel tube inlet fitting to separate from the inlet ring 107 when the base strip is lifted from the shell 52e, allowing separation of the fuel tube inlet fitting from the fuel inlet tube 109e.

Figure 3:
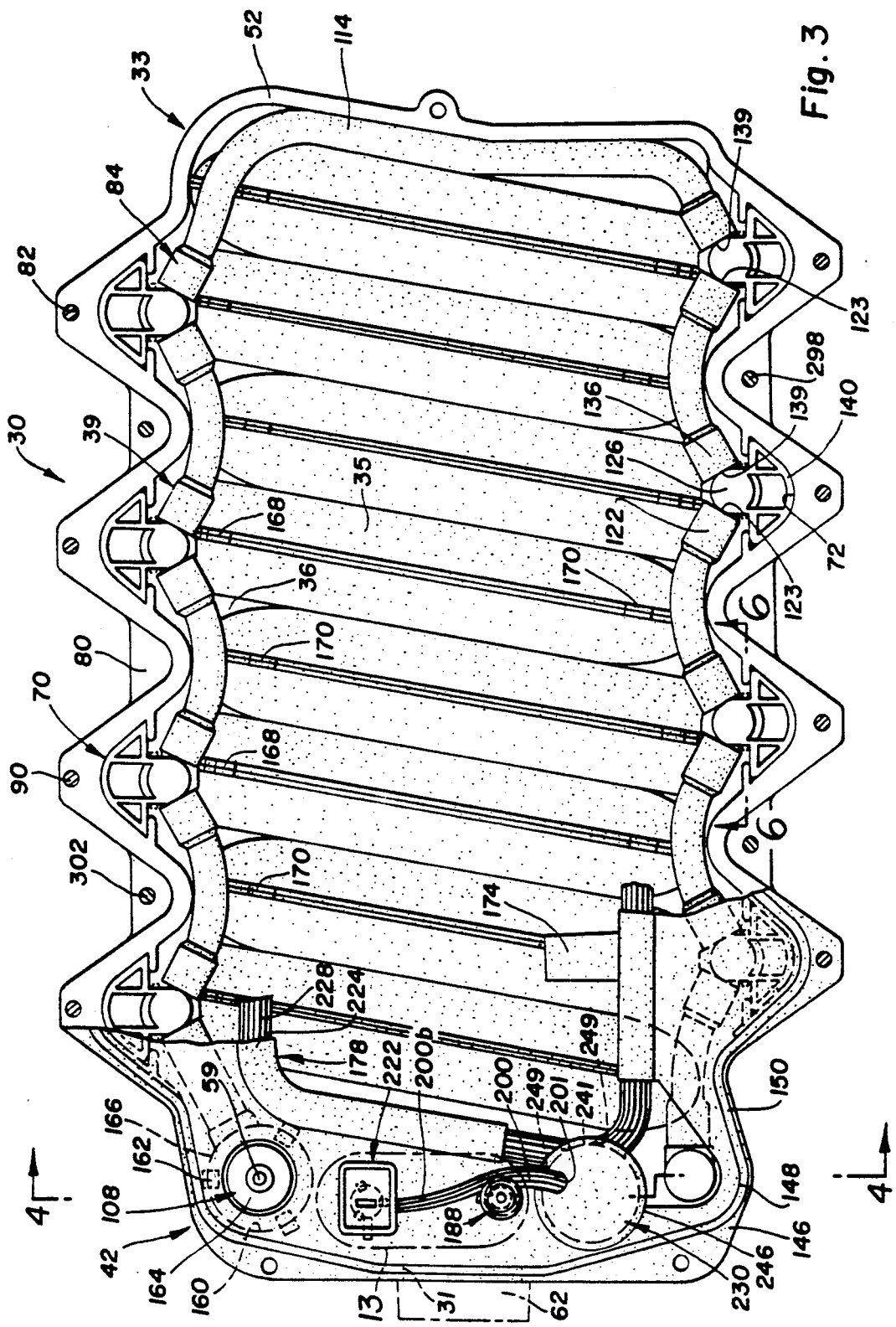
FIG. 3 is a plan view in the plane indicated by line 3—3 of FIG. 2 with the cover removed and part of the carrier being broken away showing some components in assembly.

As shown in FIGS. 3 and 4, the fuel distribution assembly 84 includes the fuel pressure regulator 108 having an inlet connected to the outlet of the string of connected fuel injectors 41. The fuel distribution assembly 84e may also include a regulator inlet connector 127 having an O-ring for connecting the outlet of the string of connected fuel injectors 41e to the fuel pressure regulator 108e.

The fuel distribution assembly 84 also includes a fuel outlet connector 131 which enables connection of the outlet of the fuel pressure regulator 108 to one end of a stainless steel fuel outlet tube 112. The fuel outlet tube 112 extends outside the casing 33 through an opening in the shell 52. The other end of the fuel outlet tube 112 is connected to a fuel tank outside the casing 33. Fuel is thereby able to flow out of the string of connected fuel injectors 41, through the fuel pressure regulator 108 and the fuel outlet tube 112 to the fuel tank.

The fuel outlet connector 131 includes a fuel outlet fitting 132 and a metal snap ring 133 which, when the fuel outlet fitting is inserted into the opening in the shell 52, expands into a recess in it to resist removal of the fuel outlet fitting from the shell. Upper and lower O-rings 135, 137 provide seals between the fuel outlet fitting 132 and fuel pressure regulator 108, and the shell 52, respectively.

An alternative embodiment of the fuel outlet connector 131e is shown in FIG. 10. The fuel outlet connector 131e includes a separate plastic outlet ring 125 which has an interference fit between the regulator housing 164e and fuel outlet tube 112e to obstruct the upper O-ring 135e from dropping out of the regulator housing.

Figure 6:
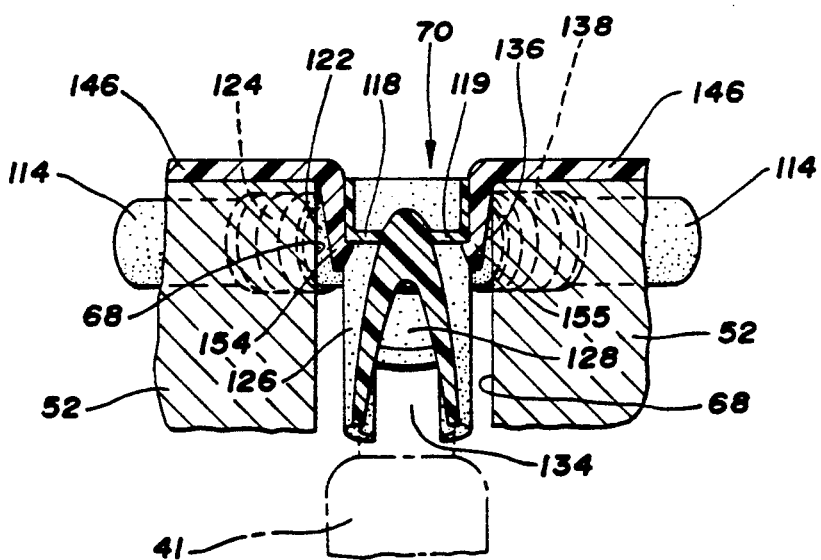
FIG. 6 is an enlarged cross-sectional view through an injector pod in the plane indicated by line 6—6 of FIG. 3.

Each injector pod 70, with a respective fuel injector 41 and fuel tubes 114 connected to it, is connected to the carrier 42 by inlet and outlet latches 154, 155 extending downward from the carrier, as shown in FIG. 6. Each inlet and outlet latch 154, 155 comprises a resilient spring arm extending downward from the base strip 146 and a resilient finger integral with the end of each spring arm. The inlet and outlet latches 154, 155 are located on the carrier 42 so that, when an injector mounting 126 is inserted upward toward the carrier between the latches, the fingers are deflected away from the injector mounting by the respective inlet and outlet ledges 118, 119. When the injector mounting 126 reaches a point where the fingers of the respective latches 154, 155 are clear of the adjacent inlet and outlet ledges 118, 119, the fingers spring toward the injector mounting to positions below the respective ledges thereby holding the injector pod 70 to the carrier 42. The inlet latch 154 engages the inlet projection 122 and the outlet latch 155 engages the outlet projection 136 to prevent rotation of the injector pod 70 with respect to the carrier 42. The cross section of each injector seat 68 adjacent the respective inlet and outlet latches 154, 155, shown in FIG. 6, is sufficiently narrow to obstruct separation of the latches from the injector pod 70 when it is inserted into the injector seat.

The surfaces of each of the fingers on the inlet and outlet latches 154, 155 which engage the inlet and outlet ledges 118, 119, respectively, may be inclined upward toward the respective spring arms. This enables disconnection of the injector pod 70 from the carrier 42 by forcibly pulling the injector pod downward away from the carrier to cause the fingers on the inlet and outlet latches 154, 155 to move away from the injector mounting 126 to a point where the fingers are clear of the respective ledges 118, 119.

Each injector pod 70e may be alternatively connected 42e by upward insertion of the pod latch as attached thereto through a slot which extends through the base strip 146e, as shown in FIGS. 8 and 9. Each pod latch 121 is formed in the injector mounting 126 so that, when the pod latch is inserted upward through the slot, the finger is deflected into the slot. When the pod latch 121 reaches a point where the finger is clear of the upper surface of the base strip 146e, the finger springs outward away from the slot to a position above the base strip 146e thereby holding the injector pod 70e to the base strip. The injector pod 70e can be disconnected from the base strip 146e by pulling it downward causing the finger of the pod latch 121 to deflect into the slot enabling the pod latch to exit the slot.

Carrier

As shown in FIGS. 1, 2, 3 and 4, the carrier 42 comprises a continuous flat base strip 146 disposed between the cover 54 and the casing flange 80. The base strip 146 is releasably connected to the interior of the casing 33 above the injector seats 68 by being clamped between the cover 54 and the casing flange 80, and by the injector pods 70. The injector pods 70 are positioned with respect to the base strip 146 so that, when the base strip is connected to the interior of the casing 33, each of the fuel injectors 41 can inject fuel into a corresponding fluid outlet 32. The base strip 146 is constructed of short glass reinforced nylon type 66 to increase its compressive strength.

As shown in FIGS. 3 and 4, the base strip 146 has a circular component opening 160 adjacent the fuel outlet tube 112 and three equally spaced integral resilient curved clasps 162 extending into the opening. The clasps 162e are preferably located away from the outer edge of the base strip 146e at which the base strip narrows, as shown in FIG. 9, to reduce the bending stresses in this region of the base strip. The fuel pressure regulator 108 has a cylindrical housing 164 which is sized so that it may be inserted into the component opening 160 without engaging the clasps 162. The regulator housing 164 has a cylindrical regulator flange 166 which, when the regulator housing is inserted upward into the component opening 160, is grasped by the clasps 162 to releasably retain the regulator housing in the component opening. The regulator housing 164 can be removed by pulling it downward out of the component opening 160 causing the clasps 162 to release the regulator flange 166. As shown in FIGS. 9 and 10, the base strip 146e may have a downwardly extending connector flange 167 facing the regulator inlet connector 127 opposite the fuel pressure regulator 108e. The connector flange 167 obstructs separation of the regulator inlet connector 127 from the fuel pressure regulator 108e.

Each clasp 162e may also comprise a resilient spring arm extending downward from the base strip 146e and a resilient finger integral with the end of each spring arm. Upward insertion of the regulator flange 166e into the component opening 160e results in the regulator flange engaging the fingers of the clasps 162e causing the fingers to deflect away from the regulator housing 164e. When the regulator flange 166e reaches a point where the fingers of the clasps 162e are clear of the regulator flange, the fingers spring toward the regulator housing 164e so that the fingers are below the regulator flange, as shown in FIG. 10. The regulator flange 166e is thereby retained by the clasps 162e in the component opening 160e. The regulator housing 164e can be removed by pulling it downward causing the fingers of the clasps 162 to move away from the regulator housing 164e to release the regulator flange 166e.

As shown in FIGS. 1, 2, 3 and 5, the base strip 146 has a conduit 178 comprising an integral channel 224 adjacent the inner edge of the base strip. Control wires 228 of the wiring harness 230 extend from each fuel injector 41 and are inserted into the channel 224 from underneath it. The control wires 228 extend through the channel 224 to a wiring harness housing 241 of the wiring harness 230.

Figure 5:
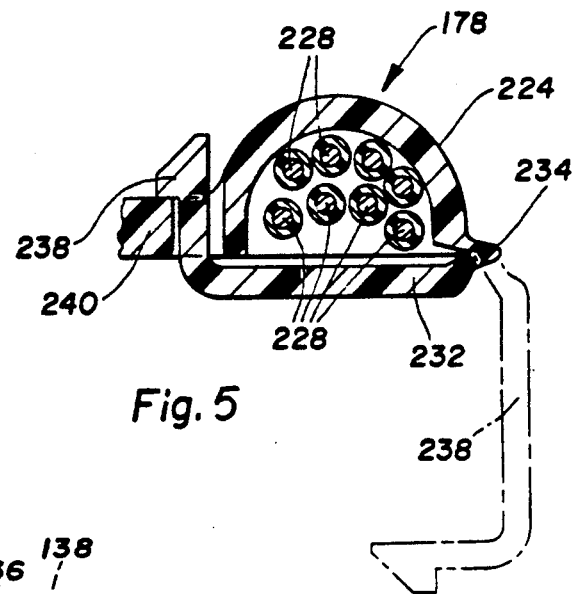
FIG. 5 is an enlarged view of circled portion 5 of FIG. 2 showing the conduit bridge in the closed position (in solid lines) and in the open position (in phantom)

As shown in FIG. 1, the conduit 178 has a plurality of bridges 232 connected to the edge of the channel 224 by hinges 234. As shown in FIG. 5, each hinge 234 is formed by thin flexible webs connecting one end of the bridge 232 and the edge of the channel 224. As shown in FIG. 5, each bridge 232 is thereby able to swing between a closed position (shown in solid lines) wherein it extends across at least a portion of the channel 224 to obstruct removal of the control wires 228 from it and an open position (shown in phantom) wherein it extends away from the channel to enable insertion of the control wires into it.

Each bridge 232 has a pair of integral resilient latches 238 extending from its free end which releasably engage an integral keeper 240 formed in the channel 224 opposite the hinge 234. Each latch 238 comprises a resilient arm projecting upward into the keeper 240 from the end of each bridge 232 when the bridges are in the closed position and a finger projecting toward the keeper. The arrangement is such that when each bridge 232 is swung to the closed position, the latch 238 moves upward toward the keeper 240 causing the finger to engage it. Continued upward insertion of the latch 238 causes the finger to move away from the keeper 240, clear its inner edge and spring toward the keeper to a position above it. The bridge 232 is thereby retained in the closed position, as shown in FIG. 5. The bridges 232 are spaced apart from one another so that gaps between them are adjacent each fuel injector 41, as shown in FIG. 1. This enables the control wires 228 from the fuel injectors 41 to extend into the channel 224 with the bridges in the closed position.

The surfaces of each of the fingers on the latch 238 which engage the keeper 240 may be inclined downward toward the respective spring arm. This enables release of the bridge 232 from the closed position by forcibly pulling it downward to cause each of the fingers on the latch 238 to move away from the keeper 240 to a point where the fingers clear it.

An alternative conduit 178e is shown in FIGS. 9 and 11. The channel 224e is formed by a pair of conduit walls which extend upward from the base strip 146e with the control wires 228e being placed in the channel. The channel 224e extends around the base strip 146e generally above the fuel tube 114e. The conduit 178e includes conduit ports 235 formed in the inner wall of the channel 224e adjacent padded carrier slots 236 in the base strip 146e. Each carrier slot 236 is adjacent a fuel injector 41e, with the padding on each carrier slot comprising a coating of dimethylsilicone rubber. The carrier slots 236 may be connected to the carrier groove 148e, via slot recesses 237 in the lower face of the base strip 146e, to enable the ribbon material which forms the carrier ribbon 150e to flow onto the carrier slots 236 to form the coating. The control wires 228e are routed from inside the channel 224e through the respective conduit ports 235 and carrier slots 236 to the respective fuel injectors 41e. The coating on the carrier slots 236 provides soft edges on the base strip 146e for the control wires 228e to adjoin.

A conduit cap 239 is attached to the base strip 146e by cap latches 233 which extend into cap slots 247 in the base strip 146e adjacent the channel 224e. when the conduit cap 239 is attached to the base strip 146e, the conduit cap covers the channel 224e. The conduit cap 239 may extend to the wiring harness housing 241 so that, when the conduit cap is attached to the base strip 146e, the conduit cap also covers the wiring harness housing.

An alternative conduit may be formed in the base strip 146 by a pair of conduit walls which extend upward from its upper face with the conduit walls being approximately parallel to the edges of the base strip. A conduit trough is defined by the area between the conduit walls into which the control wires are placed. Overhangs extend from the upper edges of portions of the conduit walls over the conduit trough to prevent removal of the control wires from it. Gaps are formed in the conduit walls adjacent the overhangs to facilitate insertion of the control wires into the conduit trough. The control wires are routed from the conduit trough to the respective injectors through openings in the base strip adjacent the base of the conduit trough.

As shown in FIGS. 1, 3 and 4, the wiring harness 230 includes a wiring harness housing 241 integral with the base strip 146 next to the air inlet 31. The wiring harness housing 241 is cylindrical and is inserted into an opening in the shell 52. The wiring harness housing 241 has notches 249 shown in FIGS. 3 and 4 adjacent its upper edge to allow the control wires 228 to extend into it from the interior of the casing 33. The interior of the wiring harness housing 241 has an integral cylindrical partition 245 with support ribs depending from its lower surface.

Figure 12:
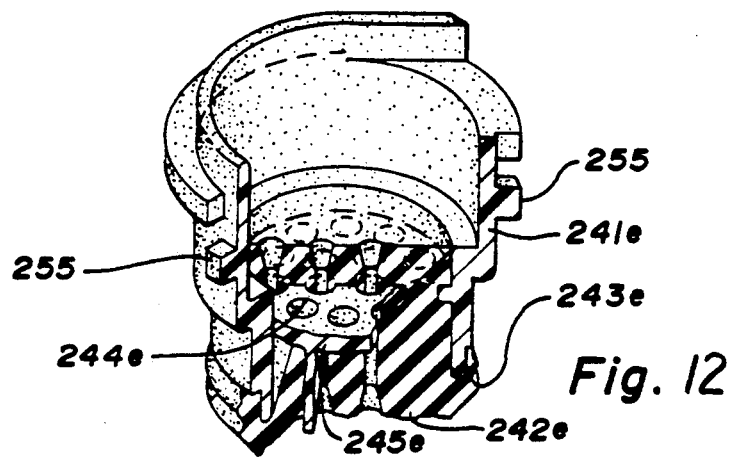
FIG. 12 is an enlarged perspective view of the wiring harness housing of FIG. 9.
Figure 13:
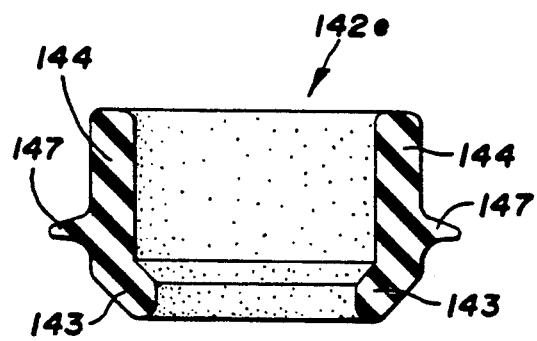
FIG. 13 is an enlarged view of the seal ring of FIG. 8.

The wiring harness housing 241e may also be detachable from the base strip 146e. As shown in FIG. 9, the base strip 146e has a harness opening 251 and three circumferential harness sockets formed in the base strip adjacent the harness opening. As shown in FIG. 12, the wiring harness housing 241e has three radial housing tabs 255 extending from its outer surface which interlock with the three harness sockets. Radial carrier gaps 257 are provided between the harness sockets so that the wiring harness housing 241e can be downwardly inserted into the harness opening 251 with the housing tabs 255 passing through the carrier gaps. The wiring harness housing 241e is then rotated with respect to the harness opening 251 so that the housing tabs 255 enter the harness sockets and interlock therewith to hold the wiring harness housing 241e to the base strip 146e.

The wiring harness 230 includes a harness cap 246 shown in FIG. 1 connected to the wiring harness housing 241 by a harness hinge 248. The harness hinge 248 is formed by a thin flexible web connecting the edge of the harness cap 246 to the upper edge of the wiring harness housing 241. The harness cap 246 is thereby able to swing between an open position wherein each control wire 228 may be inserted into the wiring harness housing 241 and a closed position.

The harness cap 246 has a plurality of integral latches 250 shown in FIGS. 1 and 4 which releasably engage a cylindrical ridge 252 on the inner surface of the wiring harness housing 241 when the harness cap is in the closed position, as shown in FIG. 4. Each latch 250 comprises a resilient arm projecting downward into the wiring harness housing 241 from the bottom of the harness cap 246 when the cap is in the closed position and a finger projecting radially outward. The arrangement is such that when the harness cap 246 is swung to the closed position, the latch 250 moves downwardly into the wiring harness housing 241 causing the finger to engage the ridge 252. Continued downward insertion of the latch 250 causes the finger to move inward, clear the ridge 252 and spring outward to a position below the ridge, thereby holding the harness cap 246 in the closed position. The harness cap 246 may be released from the closed position by forcibly pulling it upward to cause the finger of the latch 250 to move inward to a point where it clears the ridge 252. It is possible for the wiring harness 230e to lack a harness cap as shown in FIG. 9.

The wiring harness 230 includes a cylindrical sealing body 242 constructed of absorbent silicone rubber impregnated with silicone fluid. The sealing body 242 is molded inside the wiring harness housing 241 on each side of the partition 245, as shown in FIG. 4, with the partition 245 providing support to the sealing body 242. The sealing body 242 extends downward out of the wiring harness housing and radially outward adjacent the opening in the shell 52. The sealing body 242 has cylindrical beads 243 on its outer surface which are compressed when the sealing body is inserted into the opening in the shell 52 to provide a seal between the sealing body and the shell. FIG. 12 illustrates the sealing body 242e and partition 245e in the embodiment of the wiring harness 230e which is detachable from the base strip 146e.

Harness outlets 244 extend through the sealing body 242 and openings in the partition 245. The diameter of each harness outlet 244 is smaller than the respective control wire 228 which extends through it. This enables the walls of the respective harness outlet 244 to compressively or sealingly engage the respective control wire 228 extending through it to provide a seal between them. The silicone fluid in the sealing body 242 facilitates insertion of the control wires 228 into the respective harness outlets 244.

The control wires 228 extend downward out of the wiring harness housing 241 and casing 33 to the engine control module. The engine control module produces electric signals which cause the fuel injectors 41 to discharge fuel at predetermined times.

Alternatively, the wiring harness housing 241 and sealing body 242 may be replaced by a multiple wire connector. The control wires 228 would then extend from inside the casing 33 to the multiple wire connector which would be sealingly retained in an opening in the casing in a similar manner as the wiring harness 230. A corresponding connector would be connected to the outer face of the multiple wire connector to electrically connect each of the control wires 228 to a corresponding wire outside the casing 33 leading to the engine control module.

The control wires 228e may also collectively extend through the wiring harness 230e to a single cylindrical multiple wire connector located outside the casing 33e. The single multiple wire connector has a separate lead corresponding to each control wire 228e. A corresponding connector is attached to the multiple wire connector to electrically connect the control wires 228e to the engine control module.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The embodiments of the invention in which an exclusive property or privilege is claimed are defined as follows:

1. An injector pod assembly for an engine comprising an injector mounting adapted to hold a fuel injector, said injectormounting having an inlet allowing entry of fuel into the fuel injector and a fastening means on its outer surface, said injector pod assembly further comprising a carrier to which said fastening means can be releasably attached to hold said injector mounting to said carrier, wherein said fastening means includes inlet and outlet ledges and said carrier includes an inlet latch engageable with said inlet ledge and an outlet latch engageable with said outlet ledge, and further comprising an inlet projection extending away from said injector mounting adjacent said inlet ledge, and an outlet projection extending away from said injector mounting adjacent said outlet ledge, wherein said inlet latch is engageable with said inlet projection and said outlet latch is engageable with said outlet projection to hold said injector pod in alignment with respect to said carrier.

2. An injector pod assembly for an engine comprising an injector mounting adapted to hold a fuel injector said injector mounting having an inlet allowing entry of fuel into the fuel injector and a fastening means on its outer surface, said fastening means comprising three resilient pod latches, each of said pod latches comprising a resilient spring arm extending away from said outer surface and a resilient finger integral with the end of said spring arm, said spring arms having the same length and lying in a single plane, said finger on the middle of said spring arms pointing in an opposite direction with respect to said fingers on the other of said spring arms, said injector pod assembly further comprising a carrier having an oblong opening to which said fastening means can be releasably attached by inserting the ends of said spring arms through said oblong opening so that said finger on the middle of said spring arms overhangs one edge of said oblong opening and said fingers on the other of said spring arms overhang the opposite edge of said oblong opening to hold said injector mounting to said carrier.

3. An injector pod for an engine comprising an injector mounting having an injector socket adapted to hold an upper end of a fuel injector said upper end having the inlet of the fuel injector, said injector mounting having an injector slot adapted to receive an electrical connector radially projecting from the fuel injector to retain it in a predetermined alignment with respect to the axis of said injector socket, said injector mounting further including an inlet allowing entry of fuel into the fuel injector a shoulder adapted for insertion into a pod socket in the engine, the pod socket having an inlet at its top, said shoulder and the pod socket having corresponding constant cross sections in the vertical direction, and a horizontal clearance existing between said shoulder and the pod socket when said shoulder is inserted into the pod socket to facilitate insertion and removal of said shoulder to and from the pod socket, said shoulder and the pod socket each having corresponding eccentric cross sections in a horizontal plane to resist rotation and horizontal displacement of said shoulder in the pod socket to hold the fuel injector in a predetermined orientation with respect to the engine.

4. An injector pod for an engine comprising an injector mounting having an injector socket adapted to hold an upper end of a fuel injector, said upper end having the inlet of the fuel injector, said injector mounting having an injector slot adapted to receive an electrical connector radially projecting from the fuel injector to retain it in a predetermined alignment with respect to the axis of said injector socket, said injector mounting further including an inlet allowing entry of fuel into the fuel injector.

* * * * *